Oct. 18, 1932.  W. R. STOCKING  1,883,067
MEANS FOR ELECTRICALLY WELDING TABLEWARE PARTS
Original Filed Oct. 17, 1928  2 Sheets-Sheet 1

INVENTOR.
William R. Stocking

BY
ATTORNEYS.

Oct. 18, 1932.   W. R. STOCKING   1,883,067

MEANS FOR ELECTRICALLY WELDING TABLEWARE PARTS

Original Filed Oct. 17, 1928   2 Sheets-Sheet 2

INVENTOR.
William R. Stocking

BY Lancaster Allwine Rommel
ATTORNEYS.

Patented Oct. 18, 1932

1,883,067

UNITED STATES PATENT OFFICE

WILLIAM R. STOCKING, OF GLASTONBURY, CONNECTICUT

MEANS FOR ELECTRICALLY WELDING TABLEWARE PARTS

Original application filed October 17, 1928, Serial No. 313,161. Divided and this application filed March 19, 1930. Serial No. 437,116.

This invention relates to improved means for electrically butt welding a handle composed of non-ferrous metal to a stainless steel blade.

The primary object of the invention is the provision of improved electrical butt welding apparatus by means of which a die-stamped and finished handle of non-ferrous metal may be quickly, securely and economically butt welded to a die-stamped semi-finished steel blade.

Other objects and advantages of this invention will be apparent during the course of the following detailed description.

In the accompanying drawings, forming a part of this specification, and wherein similar reference characters designate corresponding parts throughout the several views, Figure 1 is a plan view of the blade or tool end of a piece of tableware, preferably a knife, showing its as formed prior to welding of the handle therewith.

Figure 1:
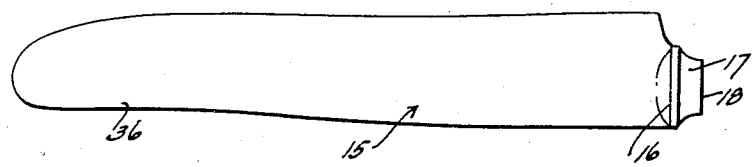

In the drawings, wherein for the purpose of illustration is shown only a preferred embodiment of the invention, it is to be noted that the apparatus for performing the welding operation has heretofore been set forth in my co-pending application Serial No. 313,161 filed October 17, 1928, of which this application is a division. The blade or tool end 15 of the article of tableware, for purposes of this invention might just as well be the prong end of a fork, or the bowl of a spoon. The invention, however, is particularly well adapted for the welding of blades of knives using a non-ferrous handle and a stainless steel blade. The blade portion 15 is die-stamped and semi-finished prior to the welding operation, and as above mentioned is entirely of stainless steel. The outline of the blade is stamped as shown in Figure 1, and is provided with a bolster 16, die-stamped thereon prior to the welding operation, and at the opposite side of the bolster from the blade body 36 it is provided with a butt 17 of stainless steel, having a face 18 normal to the plane of the blade. This butt 17 is of appreciable length and is adapted to form the foundation for electrical welding with the handle.

Figure 2:
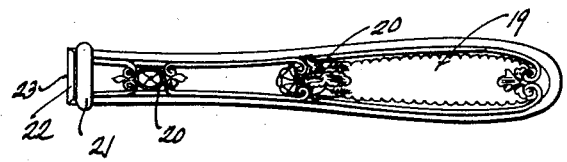
Figure 2 is a view of an ornamental die-stamped handle of non-ferrous metal as formed prior to butt welding the blade or working part of Figure 1 thereto.

The handle 19, shown in Figure 2, is of non-ferrous metal, such as nickel silver, German silver, or the like, and it is initially die-stamped prior to welding with the tool portion 15. It is die-stamped and provided with fine embossment or ornamentation 20, of approved pattern, all of which is preferably die-stamped at the time of the formation of the handle 19. The handle 19 is provided with an annular bolster 21 thereabout, which at the opposite side from the handle proper is provided with a metal welding butt 22 having a plane surface 23 arranged normal to the longitudinal axis of the handle proper. The upper and lower surfaces of the butt 22 preferably taper in convergent relation from the bolster 21 to the outer end of the butt, as is probably best shown in Figure 10 of the drawings. This construction enables a wedging action to take place in the butt 17 of the blade 15 during the electrical welding operation, since it may more readily be forced into the easier fusible butt 17. This arrangement enables a very strong butt weld to be accomplished.

It has heretofore been proposed to butt weld blank pieces of metal of different qualities and characteristics, and subsequently die-stamp them into knife or tableware form. I have found, however, that by initially die-stamping the blade and handle portions into their substantially finished contour and formation, with the ornamentation initially thereon, a more finely cut and ornamental knife is provided, which is neater in appearance, and which may be manufactured at a reduced cost.

Figure 3:
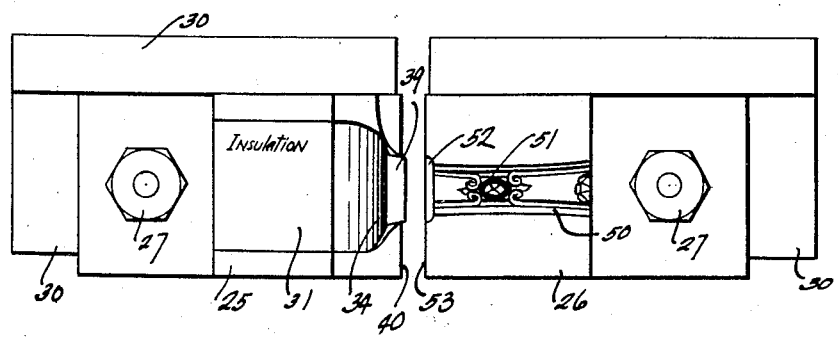
Figure 3 is a plan view of portions of the improved die as positioned upon a butt welding machine, for receiving the handle and blade portions prior to butt welding.
Figure 10:
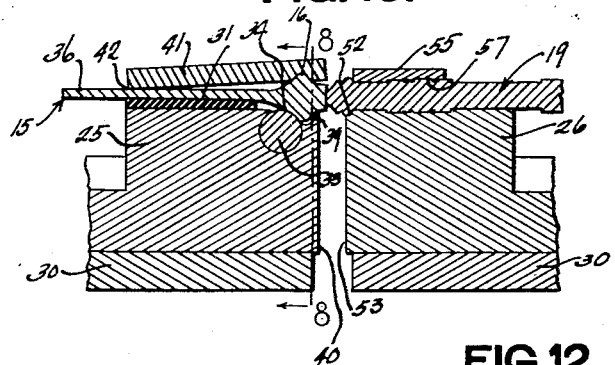

Special means have to be provided in order to carry out the above welding operation. I provide knife blades and knife handle dies 25 and 26 respectively, attached at 27 in detachable relation upon bed portions 30 of a suitable electrical butt welding machine, as shown in Figures 3 and 10 of the drawings. The blade supporting die 25 is provided with a rather large detachable insert 31, of insulation, which preferably presents a flat upper surface and is held in a recess in the top of the electrode or die part 25. Its purpose is to prevent the knife blade from being pitted by hot particles of metal during the fusing of the metal to provide the butt weld and to firmly support the blade. A relatively small cylindrical insert 33, preferably of brass or other metal which is less ductile than copper, is embedded in the part 25, and provides an arcuated convex surface 34 beyond an end of the insulation 31, against which the blade portion 15 contacts immediately at the juncture of the bolster 16 with the blade body 36, as shown in Figure 10. The adjacent part of the die 25 is recessed at 39, that is, at the opposite side from the insulation 31, to receive the lower flange of the bolster 16 when the blade rests upon the electrode 25. Of course the bolster is out of contact with the body part of the die in this position, as is shown in Figure 10.

With the blade 15 positioned in this manner upon the lower die or electrode part 25, the butt end 17 projects beyond the adjacent end surface 40 of the die part 25.

The blade holding die or electrode construction 25 also includes a top die part 41, complementary with the die part 25, which may be of other design than that shown. It is preferably elongated and adapted to rest at one end upon the blade body 36 at a relatively small cross section 42, and at its opposite end it is provided with a downwardly facing recess 43 which receives the upper flange of the bolster 16, as shown in Figure 10. This die part 41 thus has end contact only with the blade portion, and is spaced between its ends from the blade body 36, as is shown in Figure 10. There is as little metal to metal contact as possible, and this obviates liability of fusing of the blade during the butt welding operation. However, it is quite apparent that the blade portion 15 is firmly held by the complementary die parts 25 and 41.

Figure 9:
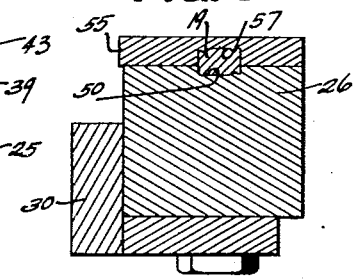
Figures 9 and 10 are cross and fragmentary longitudinal sectional views taken substantially on their respective lines in Figure 6 of the drawings.

The handle die or electrode part consists of a lower die part 26, as above mentioned, which is secured on a bed part 30 of the electrical butt welding machine, in alignment with the die part 25, but in end spaced relation therewith. The die part 26 inwardly of the upper flat surface thereof is provided with a longitudinal recess 50, which is engraved in intaglio, as shown at 51. This recess is formed to the contour of the forepart of the handle 19, so as to transversely embrace same as shown in Figure 9 and the engraving 51 receives the embossment or ornamentation 20 of the handle in conforming fitting relation therein, as protection therefor. At its front end the recess 50 has an enlargement 52 outletting upon the end face 53 of the electrode 26.

The handle portion 19 is placed upon the electrode part 26 so that the embossment thereon seats in conformity in the recess 50 and more particularly in the engraved grooving 51 therein; the lower flange portion of the bolster 21 seating in the enlarged recess 52. This holds the handle portion 19 in proper position upon the die part 26, with the butt end 22 projecting beyond the end face 53 of the die part 26, and in immediate centered contact at its end face 23 with the face 18 of the butt 17 of the blade 15, as is well shown in Figure 10 of the drawings.

Figures 4, 5:
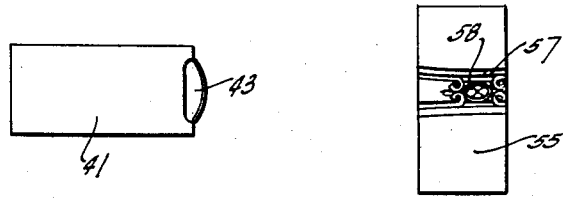
Figure 4 is a view showing the work engaging face of one of the complementary blade die parts.
Figure 5 is a view showing the work engaging face of the top part of the handle holding die.

Complementary with the handle portion electrode part 26 there is provided an upper part 55, which has a recess 57 therein, as shown in Figure 5, engraved in intaglio, as shown at 58, to receive the embossment or ornamentation 20 of the upper face of the handle 19, to prevent damage or marring thereto during the application of the electrodes thereto, and during the butt welding operation, this electrode part 55 also transversely embracing the handle portion and preferably engaging the lower electrode part 26, as shown in Figure 9.

The upper die parts 41 and 55 may be suitably clamped in any conventional relation ordinarily provided upon butt welding machines, in position upon their respective blades and handles, and to the lower die or electrode parts.

During the butt welding operation the current is sent through the blade portion 15, and at the instant that the butts 17 and 23 of the blade and handle portions are brought together in the machine, the blade portion 15 is moved longitudinally against the butt 22 of the handle 19; permitting the wedge-shaped butt 22 to readily enter into the fusible metal butt 17. The butt 17, of course, gets hotter than the non-ferrous metal, and breaks down where the weld is to be made, so that while the butt 22 is fused with the butt 17, the major weld takes place within the area of the butt 17. This provides a very strong joint, and it is to be noted that the handle is held firmly and immovably between its ends while the blade is moved at the instant that the weld takes place. The dies are of solid copper with the exception of the insulation portion 31 and the metal insert 33. They do not heat to any appreciable extent, and if the dies are kept clean the insert and plate portions would not have to be provided, but they obviate pitting of the steel blade.

Figure 6:
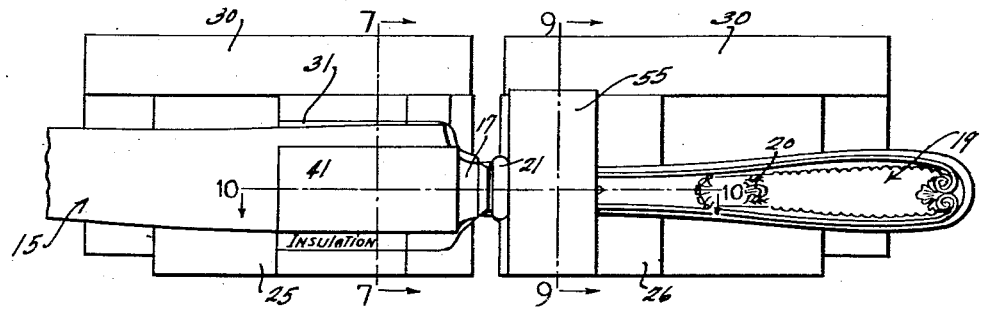
Figure 6 is a view showing the relation in which the die parts hold the blade and handle portions of the knife prior to the welding operation.
Figure 7:
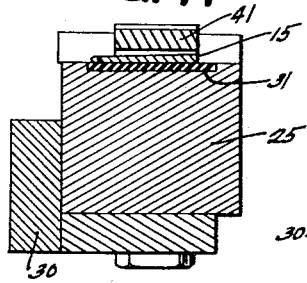
Figure 7 is a cross sectional view taken substantially on the line 7—7 of Figure 6.
Figure 8:
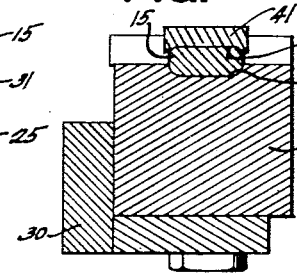
Figure 8 is a cross sectional view taken substantially on the line 8—8 of Figure 10.
Figure 11:
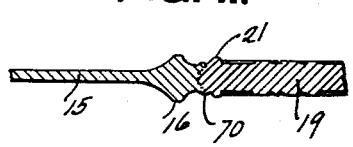
Figure 11 is a fragmentary longitudinal sectional view through the juncture of the blade and handle portions of the knife, immediately after welding.
Figure 12:
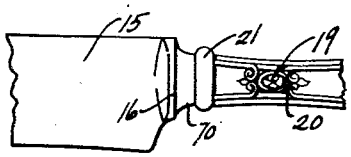
Figure 12 is a fragmentary plan view of the knife at the welded juncture of the handle and blade portions, showing the finished connection.

The relation of the butts 17 and 22 just prior to the welding operation is shown in Figures 6 and 10, and after being welded they provide a connection 70 shown in Figures 11 and 12 of the drawings. It is finished off in an annularly grooved relation between the knife blade and handle bolsters, so that the joint after polishing is invisible.

Various changes in the shape, size, and arrangement of parts of the welding apparatus and in the figured ornamentation provided in intaglio in the recesses thereof, to suit the embossment on the handle 19, may be made without departing from the spirit of the invention or the scope of the claims.

I claim:

1. In a die for holding the blades of knives to be provided with handles, the combination of a lower die portion of copper having an insulation blade resting surface thereon against which the blade may abut, and a second die portion cooperating in a clamping relation upon the blade portion at the opposite side thereof with respect to the first mentioned die portion.

2. In a die for holding the blades of knives to be provided with handles, the combination of a lower die portion of copper having an insulation blade resting surface thereon against which the blade may abut, a second die portion cooperating in a clamping relation upon the blade portion at the opposite side thereof with respect to the first mentioned die portion, said die portions having bolster receiving recesses in the facing sides thereof.

3. In a die for holding the blades of knives to be provided with handles, the combination of a lower die portion of copper having an insulation blade resting surface thereon against which the blade may abut, a second die portion cooperating in a clamping relation upon the blade portion at the opposite side thereof with respect to the first mentioned die portion, said die portions having bolster receiving recesses in the facing sides thereof, the first mentioned die portion having a metal insert therein of different metal than the said die portion, against which the blade at the juncture of its bolster therewith may rest.

4. In apparatus for electrically butt welding a blade end of a knife to a handle having a finely embossed ornamental pattern design thereon, the combination of separate blade and handle supporting electrode dies, the handle die having a cavity for transversely embracing the handle, said die in the cavity having the surfaces thereof ornamentally engraved for true complementary reception of the finely embossed ornamental pattern design of the handle part as a protection therefor during the welding operation.

5. In a welding electrode having a recess, a relatively small metal conductor piece upon the electrode against which the body to be welded rests, and a relatively large piece of insulating material in the recess for receiving thereupon other surfaces of the body to be welded to decrease conductor surface contact of the body and firmly support the body to be welded on said electrode.

6. In a welding electrode the combination of a conductor body having a part adapted to conductively engage a surface of the body to be welded, and insulation means on said electrode adapted to engage another surface of the body to be welded in resting relation thereon.

7. In a welding electrode construction for welding a metal handle to a steel blade which has bolster flanges laterally extending beyond the plane of the blades at opposite sides of the blade and at the welding end thereof, the combination of a main conductor electrode having means to receive the blade thereon in insulated relation, with a current conducting contact at the blade bolster flange.

8. In a welding electrode construction for welding a metal handle to a steel blade which has bolster flanges laterally extending beyond the opposite sides of the plane of the blade, and at the welding end thereof, the combination of a pair of complementary copper electrode parts having bolster receiving recesses in the facing surfaces thereof, and a bolster abutting metal insert fixed with at least one of said electrode parts at the bolster receiving recess thereof and formed of metal appreciably less ductible than the copper of said electrode part.

WILLIAM R. STOCKING.